(12) United States Patent
Collins et al.

(10) Patent No.: US 8,386,471 B2
(45) Date of Patent: *Feb. 26, 2013

(54) OPTIMIZING QUERIES IN A MULTI-TENANT DATABASE SYSTEM ENVIRONMENT

(75) Inventors: Jesse Collins, San Francisco, CA (US); Jaikumar Bathija, Fremont, CA (US)

(73) Assignee: Salesforce.com, Inc., San Francisco, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 12/885,255

(22) Filed: Sep. 17, 2010

(65) Prior Publication Data

US 2011/0295839 A1 Dec. 1, 2011

Related U.S. Application Data

(60) Provisional application No. 61/349,126, filed on May 27, 2010.

(51) Int. Cl.
 *G06F 17/30* (2006.01)
(52) U.S. Cl. ......... 707/716; 707/769; 707/718; 707/713
(58) Field of Classification Search .................. 707/812, 707/713, 716, 714, 715, 784, 770, 719; 717/173
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

OTHER PUBLICATIONS

Multi-Tenant Databases for Software as a Service: Schema-Mapping Techniques, Aulbach et al., Jun. 8, 2006.*

(Continued)

*Primary Examiner* — Jean M Corrielus
(74) *Attorney, Agent, or Firm* — Ingrassia Fisher & Lorenz, P.C.

(57) ABSTRACT

In a method, system, and computer-readable medium having instructions for optimizing a query in a database system, a database statistic is generated for a number of related records for one or more entities for at least one tenant and a related record is a record with a relationship to a shared record in a database table for an entity from the one or more entities, a first cost is calculated for accessing the number of related records for at least one tenant, a second cost is calculated for accessing a number of related records accessible to a user, a comparison of the first cost to the second cost is performed to determine a data access path for retrieving accessible related records, and the data access path for retrieving accessible related records is determined based upon the comparison.

20 Claims, 6 Drawing Sheets

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2010/0211619 A1* | 8/2010 | Weissman et al. ............ 707/812 |
| 2010/0217758 A1* | 8/2010 | Weissman et al. ............ 707/713 |
| 2010/0223254 A1* | 9/2010 | Weissman et al. ............ 707/716 |
| 2010/0223255 A1* | 9/2010 | Weissman et al. ............ 707/716 |
| 2010/0235837 A1* | 9/2010 | Weissman et al. ................ 718/1 |
| 2010/0274779 A1* | 10/2010 | Weissman et al. ............ 707/714 |
| 2010/0281014 A1* | 11/2010 | Weissman et al. ............ 707/715 |
| 2010/0281015 A1* | 11/2010 | Weissman et al. ............ 707/716 |
| 2010/0281016 A1* | 11/2010 | Weissman et al. ............ 707/716 |
| 2010/0299664 A1* | 11/2010 | Taylor et al. ................... 717/173 |
| 2011/0082854 A1* | 4/2011 | Eidson et al. .................. 707/714 |
| 2011/0246449 A1* | 10/2011 | Collins et al. .................. 707/715 |
| 2011/0258178 A1* | 10/2011 | Eidson et al. .................. 707/714 |
| 2011/0258179 A1* | 10/2011 | Weissman et al. ............ 707/714 |
| 2011/0283266 A1* | 11/2011 | Gallagher et al. ............. 717/130 |

OTHER PUBLICATIONS

A Study and Performance Evaluation of the Multi-Tenant Data Tier Design Patterns for Service Oriented Computing, Wang et al., IEEE, 2008.*

A Framework for Native Multi-Tenancy Application Development and Management, Guo et al., IEEE 2007.*

A Software as a Service with Multi-tenancy Support for an Electronic Contract Management Application, Kwok et al., IEEE 2008.*

* cited by examiner

OPTIMIZING QUERIES IN A MULTI-TENANT DATABASE SYSTEM ENVIRONMENT

CROSS REFERENCE TO RELATED PATENTS

This application claims the benefit of U.S. Provisional Patent Application 61/349,126 entitled "Methods and Systems for Optimizing Queries in a Multi-tenant Database System Environment," filed May 27, 2010, Collins et al., the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to optimizing queries in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. A query optimizer may be used to optimize the query to choose certain data paths. Statistics may be relied upon to determine the optimal data paths to use to reduce disk accesses in retrieving data in response to a request. The efficient retrieval of accurate information and subsequent delivery of this information to the user system is desirable.

Unfortunately, conventional database approaches for the query optimizer might become inefficient because the query optimizer relies on statistics gathered by an optimizer unaware that organizations may share a database.

Accordingly, it is desirable to provide techniques enabling a query optimizer of the database system to improve data path selection of the database system.

BRIEF SUMMARY

In accordance with embodiments, there are provided methods, computer readable mediums, systems, and apparatuses for optimizing queries in a multi-tenant database system environment.

In an embodiment and by way of example, a method for optimizing queries in a multi-tenant database system environment is provided. In a method, system, and computer-readable medium having instructions for optimizing a query in a database system, a database statistic is generated for a number of related records for one or more entities for at least one tenant and a related record is a record with a relationship to a shared record in a database table for an entity from the one or more entities, a first cost is calculated for accessing the number of related records for at least one tenant, a second cost is calculated for accessing a number of related records accessible to a user, a comparison of the first cost to the second cost is performed to determine a data access path for retrieving accessible related records, and the data access path for retrieving accessible related records is determined based upon the comparison.

While one or more implementations and techniques are described with reference to an embodiment in which for optimizing queries in a multi-tenant database system environment is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
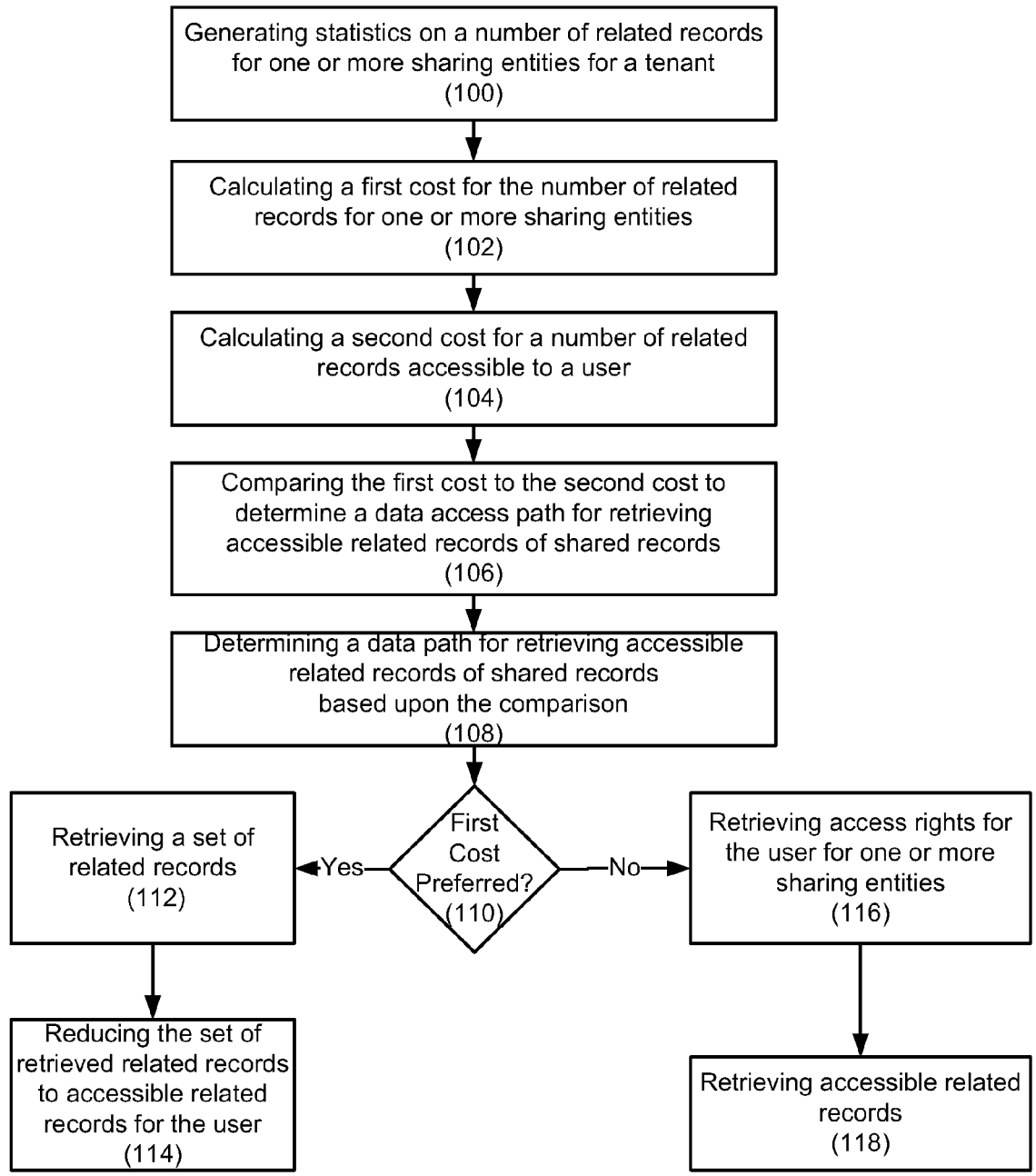
FIG. 1 illustrates an example of a simplified flow diagram for an embodiment of optimizing queries in a multi-tenant database system environment.

Systems, computer readable mediums with instructions, computer program products, and methods are provided for optimizing queries in a database system. In one or more embodiments, queries may be optimized by a query optimizer for a multi-tenant database system. It may be desirable to optimize queries for a tenant of a multi-tenant database system when the queries involve determining accessibility to records or data rows of entities that are implemented with a sharing model. In a relational database, the entities may be database tables or views. In an object database, the entities may map to object classes. Although examples provided throughout may refer to an entity as a database table, those skilled in the art will recognize that there are various ways an entity of a database design may be implemented.

A sharing model defines access rights for records (e.g. data rows) of an entity in a database system. The access rights may indicate which user or group of users may access shared records of the entity. For example, a record may be embodied as a row in a table in the multi-tenant database system. Hence, in this example, the sharing model defines row-level access to the database table in the multi-tenant database system.

A sharing entity is an entity that employs the use of a sharing model. For example, a sharing entity may have a database table for the entity of the database design and a corresponding sharing table that indicates the access rights for each shared record in the database table.

A shared record (e.g. a data row in a database table) may have defined access rights to permit access to the record by a user and/or a group of users. Those access rights define which user and/or group of users have access to the shared record.

In one or more embodiments, a query that involves the retrieval of information from a shared record of an entity that is implemented with a sharing model is optimized. The access rights for the data rows of an entity implementing a sharing model may extend to related records, such as the child records of the shared records. A related record may be a parent record, a child record, a sibling record, or any other record designated (e.g. formulaically, hierarchically, or in some other way) as being related to a record.

In one or more embodiments, a query that involves the retrieval of related records to a shared record of an entity may be optimized. For example, queries may be optimized for a tenant to ensure efficient retrieval of child records of shared records that are accessible by a user in accordance with the access rights for the user and one or more accessibility rules.

To optimize a query, in an implementation, a cost benefit analysis of data path options may be performed for a query involving retrieval of related records to one or more shared records of a tenant that are accessible by a user. A user that has access to a relatively large number of child records may benefit from a different data path than a user that has access to a relatively smaller number of child records. In a preferred embodiment, the data rows being retrieved may be child records of shared records for a database supporting Customer Relationship Management (CRM) software. In one or more embodiments, the child records are activity records for entities with records or data rows that are shared by one or more users. For example, the activity records may be to-do items or events for a particular lead, contact, opportunity, campaign, or any other type of entity with shared records that may be useful for sales.

Query optimization for requests that involve retrieval of data rows related to shared records of a sharing entity may vary by tenant as well as by user. Statistics may be recorded to allow for selection of a data path that considers the child records for one or more sharing entities for both a tenant and a user. In one or more embodiments, a cost benefit analysis may be performed to determine an optimal data path for a query using the recorded or generated statistics.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. While the present invention is described with reference to an embodiment in which techniques for optimizing queries are implemented in a system having an application server providing a front end for an on-demand database service capable of supporting multiple tenants, the present invention is not limited to multi-tenant databases nor deployment of application servers. Embodiments may be practiced using other database architectures, i.e., ORACLE®, DB2® by IBM and the like without departing from the scope of the embodiments claimed. As used herein, the term query plan refers to a set of steps used to access information in a database system.

As used herein, the term "user" is construed broadly to describe an individual, a group of individuals, and/or any other set of users that access the online service system.

In the following examples, one or more implementations are illustrated for optimizing queries. In alternate implementations, the illustrated processes and process steps may be combined into fewer steps, divided into more steps, and/or performed in a different sequence.

FIG. 1 illustrates an example of a simplified flow diagram for an implementation of optimizing queries in a multi-tenant database system environment. Statistics on a number of related records for one or more sharing entities of a tenant may be generated (100). Database statistics may be kept in order to determine whether a user has access to a relatively large number of related records to sharing entities. The related records may be related to records or data rows of a sharing entity. For example, the related records may be child records of shared records of a sharing entity. In another embodiment, the related records may be shared records of a sharing entity.

In an implementation, statistics may be generated and maintained on a number of child records for one or more sharing entities, and statistics may be kept on a number of child records for one or more sharing entities accessible to a user. In one or more embodiments, statistics may be kept on a number of public related records for one or more sharing entities. The public related records may be public to the tenant. Private related records may be available to one or more users of a multi-tenant database. In a preferred embodiment, the sharing entity has a first database table with shared records and a second corresponding sharing database table for the entity that indicates access rights for the shared records.

In general, a query optimizer may generate and maintain statistics on database tables, indexes, columns, and system statistics, and the statistics may be used to determine an optimal data path for retrieval of data. For example, statistics may be generated on a number of rows for a database table and the average row length in a database table. A database query optimizer may be set to generate statistics and maintain the statistics or the statistics can be generated on-demand. Statistics may be generated and maintained for the number of data rows in each table for the tenant, and statistics may be generated for a number of data rows in each table that are accessible to the user. For example, statistics may be generated for a number of child records of all sharing entities for a tenant.

In a multi-tenant database environment, statistics may be generated for each tenant as opposed to using statistics for the entire table because the user may only be permitted to access to data for a particular tenant. In another embodiment, statistics may be generated on all tenants with data that the user is permitted to access. For example, if a user is permitted to access data from a plurality of tenants, then the statistics may be generated for all child records of sharing entities for the plurality of tenants or the set of tenants that are relevant to queries for the user.

When a query is received for related records of sharing entities, in one implementation, the query optimizer may perform a cost comparison in order to determine the optimal data path for retrieving accessible related records. For example, if a request for a query is received for all activities that are accessible to a user, then all data rows for activities that are owned by the user and subordinates may be retrieved in addition to all of the activities related to accessible shared records for the user and subordinates in accordance with the user's access rights. An optimal data path for retrieval of child records of shared records of sharing entities that are accessible by a user may differ based upon the number of child records that are accessible to the user. In one or more embodiments, the number of related records for a tenant may indicate the optimal path for a database request. Alternatively, a different metric (e.g. access time, I/O performance) or a combination of metrics may be used to determine the optimal data path.

An implementation of a query optimizer optimizing queries with generated statistics is described in U.S. patent application Ser. No. 12/420,693, entitled "Query Optimization in a Multi-Tenant Database System," filed on Apr. 8, 2009, which is incorporated herein by reference Continuing with FIG. 1, a first cost for a number of related records for one or more sharing entities may be calculated (102). For example, the statistics on a number of data rows in a table of related records to sharing entities for a tenant may be used to generate the first cost. In another example, a statistic on a number of data rows in a table of related records for sharing entities relevant to a received query may be used to calculate the first cost. Statistics may be kept on how many data rows are in a table of activities (e.g. events, to-do items) for all records of sharing entities such as, by way of example, leads, contacts, campaigns, opportunities, and any other type of entity with records or data rows that may be shared among users. The number of related records may indicate how many rows must be scanned in the table for the related records in order to respond to a database request. If there are a small number of related records, then there may be few data rows to scan in response to a database request for the related records. In another embodiment, the statistics on a number of data rows in a table of related records for the sharing entities of one or more tenants may be used to generate the first cost. In one or more embodiments, the number of related records that are public for one or more tenants may be used to determine the first cost.

A second cost is calculated (104). Here, the cost may be calculated with a number of related records accessible to a user. For example, the second cost may be calculated with statistics that include, but are not limited to, a number related records owned by a user and/or subordinates of the user, a number of public related records, and statistics on related records accessible to the user. The related records accessible to the user may be the number of related records to shared records that are accessible to the user for all sharing entities for one or more tenants. Continuing with the activities example from above, the number of related records accessible to the user for all sharing entities may be the number of activities for leads that are accessible to the user, the number of activities for all campaigns that are accessible to the user, and added together with the number of related records for all the other sharing entities of the tenant, etc. In one embodiment, these numbers are added to the number of related records for all the other sharing entities of the tenant.

A comparison may be performed between the first cost and the second cost to determine a data path for retrieving accessible related records of sharing entities (106). The cost of scanning or accessing an entire table of related records (e.g. the first cost) may be weighed against retrieving or accessing the rows of related records that are accessible to the user (e.g. the second cost) to determine an efficient data path for retrieval of accessible related records. Alternatively, other metrics such as type of date, how the data is stored and indexed, etc. may also be used.

Assume for the following examples, that the number of records accessible is the sole measure for determining cost. For example, if there are a small number of related records, then there may be few data rows to scan and it may be preferable to scan the entire table of related records for records that are accessible to the user. In another example, if there are a large number of related records and the user has access to a relatively small number of related records, then it may be preferable to retrieve the access rights for the user and retrieve the related records with foreign keys for the shared records (e.g. who_id, what_id) that the user can access.

A data path for retrieving accessible related records of shared records may be determined (108). A query optimizer may be utilized to determine the optimal data path for retrieving accessible related records of sharing entities. Note that although the term optimal data path is used, that does not necessarily ensure that the most efficient data path (at least in terms of the actual run-time) will always be identified. There may be instances where, based on the number of accesses, type of data stored, locks and other security measures, and for various other reasons one path may be identified as "optimal" although it does not necessarily run in the least amount of time.

An implementation of a query optimizer is described in U.S. Pat. No. 7,529,728, entitled "Query Optimization in a Multi-Tenant Database System," filed on Sep. 23, 2003, which is incorporated herein by reference.

In one or more embodiments, a determination is made as to whether a first cost is preferable to a second cost (110). If a first cost as compared to the second cost is preferable (110), then a set of related records may be retrieved (112).

The optimal data path for determining accessible related records for the user may involve retrieving a set of related records that meet initial filter conditions and reducing the set of related records to the accessible records in accordance with accessibility rules. It may be desirable to consider the worst case for a given approach to retrieving related records. For example, in the worst case with an approach for retrieval of accessible related records that includes retrieving related records and reducing the set of retrieved records to set of accessible records, the rows of the related records table may have to be scanned twice (e.g. once to retrieve the filtered records and a second time to eliminate records that are not accessible). If the user has access to a relatively large number of child records of shared records for sharing entities, then this data path approach may be the optimal data path for retrieval of the related records of shared records. If there are a relatively small number of child records, then this data path approach may be the optimal data path for retrieval of the related records. Although examples are given for weighing costs to determine an optimal data path, those will skill in the art will recognize that, as noted above, there are many approaches to determining the optimal data path for retrieving related records to shared records in a multi-tenant database system.

Initial filter conditions may be conditions that are applied during retrieval of records. For example, initial filter conditions may include, but are not limited to, a date range, a specific tenant, a public or private designation for records, a set of attributes desired from a record, a set of sharing entities, and/or another condition for reducing a set of records retrieved from a database. Initial filter conditions may have filter conditions for the query for retrieval of related records for a tenant. For example, if a query is received that requests retrieval of all activity records of a user, then all child records may be scanned to identify the child records for shared records of sharing entities that are accessible to the user. The user may apply a set of filter conditions and/or an API for the multi-tenant database system may set filter conditions.

If the first cost is preferred, then the set of retrieved related records is reduced to the set of accessible related records (114). In a preferred embodiment, the child records to shared records of one or more sharing entities may be selected that meet the filter conditions and the data rows of the related records may be reduced to a set of accessible related records in accordance with the access rights of the user. In one embodiment, the child records accessible to the user may include child records owned by the user and subordinates of the user in addition to activities related to a shared record of a shared entity that are accessible to the user. An index, in an example, may be used to determine all activities accessible to a user and a user's subordinates based upon ownership of the activity.

The shared records for the set of retrieved related records may be identified from the sharing tables and access rights to the shared records may be verified in order to reduce the set of related records to the accessible related records. In a preferred embodiment, the child records have foreign keys for the related shared record and the foreign key may be used to check the access rights for the user on the shared record in a sharing table.

Continuing with FIG. 1, if a second cost is preferable to the first cost (110) after the comparison, then the access rights may be retrieved for the user for one or more sharing entities (112). The corresponding sharing tables for one or more sharing entities relevant to the database query may be accessed to retrieve the access rights for all shared records of the sharing entities. In an embodiment, the records indicating shared records are accessible to the user may be retrieved before retrieving the related records for the shared records. For example, the shared tables for the shared entities may be accessed to identify the shared records that are accessible to the user and the child records may then be identified using the set of foreign keys for each shared entity accessible to the user. In a preferred embodiment, a view may be used for the query to retrieve activities in response to the database request.

Although examples are provided for retrieving accessible records for a tenant, those skilled in the art will recognize that a user may have access to one or more tenants and the cost benefit analysis may be performed using the statistics for one or more tenants and the data path chosen may rely on those statistics to determine an optimal data path. In one or more embodiments, a user of a first tenant may have one or more shared records with a user of a second tenant, and the first tenant may retrieve their version of the shared record with their tenant_id and the shared record may have a foreign key for the corresponding record in a table for the second tenant.

Figure 2:
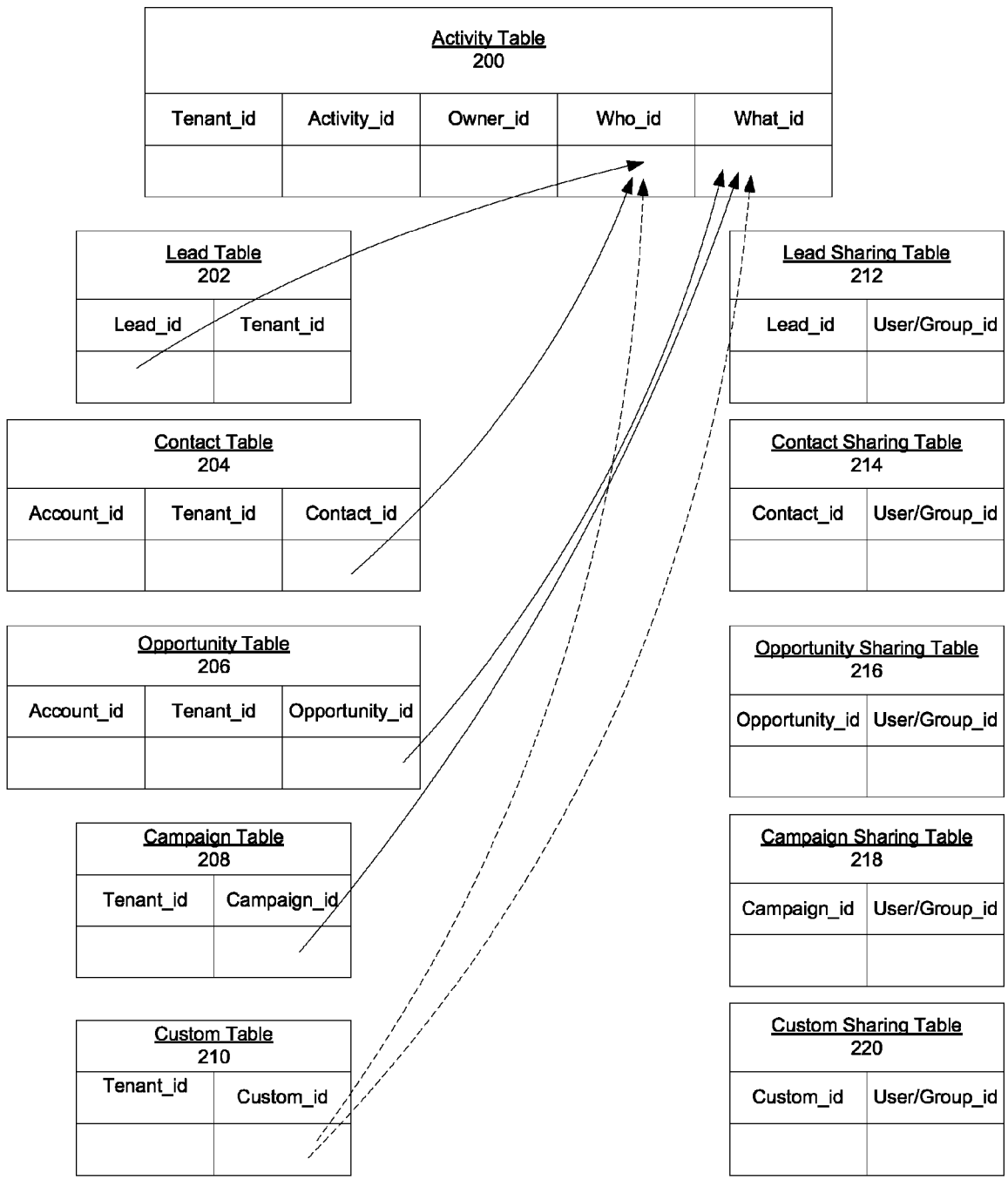
FIG. 2 illustrates an example of an implementation of a sharing model for entities and entities related to the shared records for an embodiment of optimizing queries in a multi-tenant database system environment.

FIG. 2 illustrates an example of an implementation of a sharing model for entities and entities related to the shared records for an embodiment of optimizing queries in a multi-tenant database system environment. In FIG. 2, the Activity 200 entity may be a table in a database with data rows that are records representing activities including, but not limited to, events, tasks, meetings, to-do items and/or any other activity for a related record that is shared with one or more users. The Activity 200 table may have attributes or fields for the records including, but not limited to, "Tenant_id," "Activity_id," "Owner_id," "Who_id," and "What_id." The "Activity_id" may be a primary key for the Activity table. The "Who_id" and "What_id" may be a foreign key(s) for the Activity 200 table and a primary key for a record in a table for a sharing entity, including, but not limited to, a Lead, a Contact, an Opportunity, a Campaign, and/or any other custom entity. In one or more embodiments, the sharing entities may be entities in a database used for Customer Relationship Management (CRM) software.

An activity record or data row within the Activity Table 200 may be related to a shared record of an entity, such as, by way of example, a child record of a shared record. The "Who_id" may be a primary key for tables of sharing entities, including, but not limited to, Lead Table 202, Contact Table 204, and/or any other Custom Table 210. A Custom Table 210 may be a table for a custom entity that may be created and/or used by a tenant to represent information. An implementation of custom entities/objects are described in U.S. patent application Ser. No. 12/764,780, entitled "Custom Entities and Fields in a Multi-Tenant Database System," filed on Apr. 21, 2010, which is incorporated herein by reference. The "Who_id" may be a primary key for a sharing entity that involves a person. The "What_id" may be a primary key for a sharing entity that involves an event, including, but not limited to, Opportunity Table 206, Campaign Table 208 and/or a Custom Table 210. The "Tenant_id" may be a foreign key for the Activity 200 table and a primary key for a Tenant entity in a Multi-tenant database. The Tenant entity may provide information on tenants supported by the Multi-tenant database. The "Owner_id" may be a foreign key for the Activity 200 table and a primary key for an Owner table representing a user or group of users.

The sharing entities Lead, Contact, Opportunity, Campaign, and Custom Entity may have sharing tables: Lead Sharing Table 212, Contact Sharing Table 214, Opportunity Sharing Table 216, Campaign Sharing Table 218, and Custom Sharing Table 220, respectively. The sharing tables may have data rows or records that indicate the users or groups of users that have access to the shared entity. A tenant may establish any number of accessibility rules for what is accessible or visible to a user of the multi-tenant database system. For example, a tenant may establish a rule that a user may have access to all activities that the user is identified as an owner (e.g. "Owner_id"="User_id") and access to all activities of the user's subordinates. In another example, the tenant may establish a rule that allows a user to have access to activities that are related to all sharing entities (e.g. lead, contact, opportunity, campaign, and custom) for which the user has access. Continuing with the example, the user may have access to one or more opportunities, as indicated in the Opportunity Sharing Table 216 (e.g. "User_id"), and the user may be able to view all activities related to each of the opportunities. The tenant may establish accessibility rules that specify a user that has access to a shared entity specified in the "What_id" column of an activity record but does not have access to the corresponding "Who_id" for the activity may not be able to view the activity.

In one or more embodiments, the tenant may create public sharing entities that may be accessible and/or visible to all users for the tenant. Although various examples are given for establishing accessibility rules for the accessibility and visibility of sharing entities and related records to shared records of sharing entities, those skilled in the art will recognize that there are any number of accessibility rules that may be established for the visibility of shared entities and related records.

Figure 3:
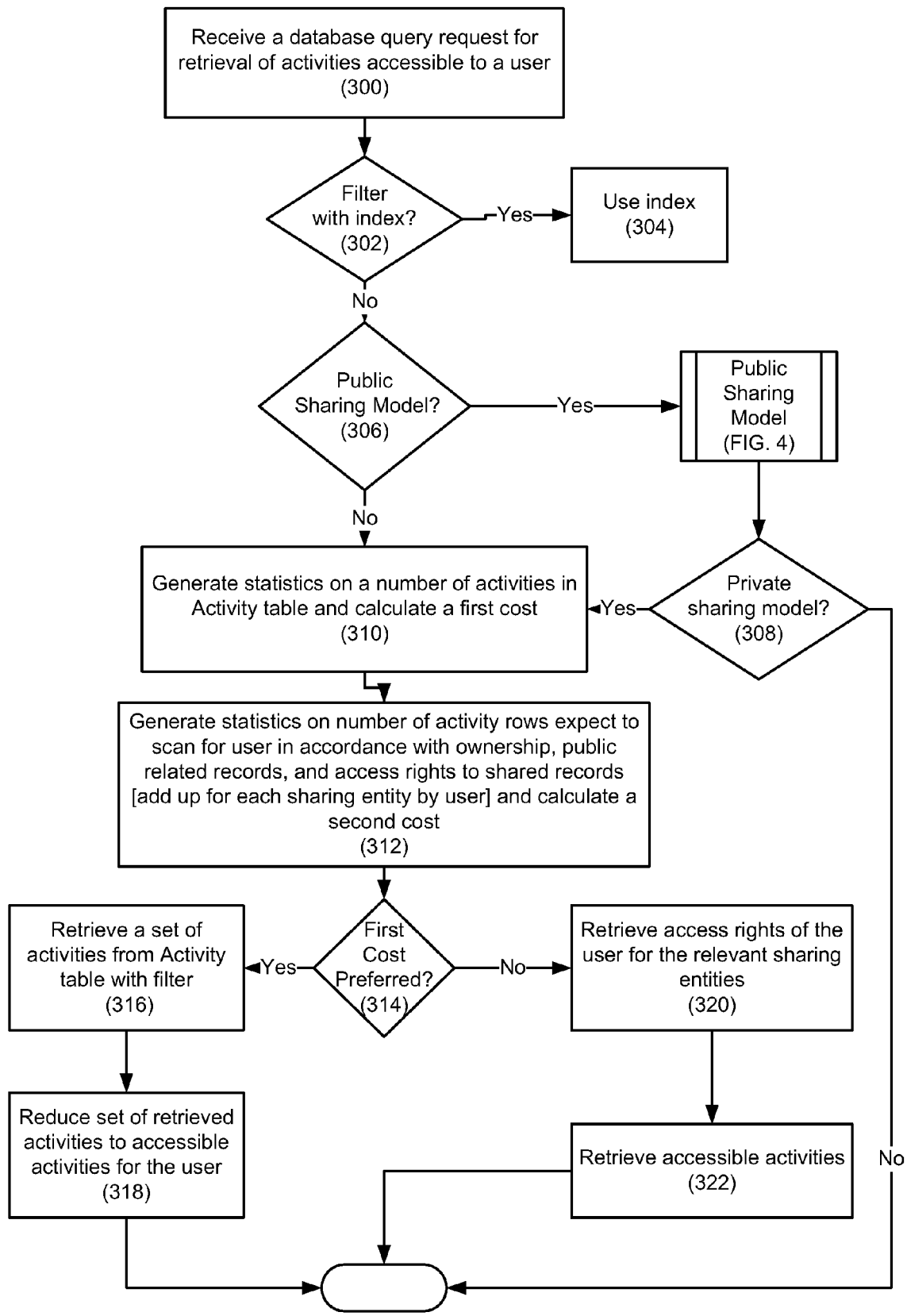
FIG. 3 illustrates an example of a flow diagram for an embodiment of optimizing queries in a multi-tenant database system environment.

FIG. 3 illustrates an example of a flow diagram for an embodiment of optimizing queries in a multi-tenant database system environment. Initially, a query may be received requesting retrieval of related records of shared records from entities implemented using a sharing model. The query may be received from an application programming interface (API), a request for a list view, a request for running a report, a SOQL or SQL query inputted by a user, a user interface, and/or any other way of sending a query request to a database. The query optimizer may generate SQL from the SOQL query. In an embodiment, a user may enter keywords in a text box for search on user interface that triggers a search for all child records of shared records from one or more sharing entities. In one or more embodiments, a query requesting retrieval of child records of sharing entities accessible to a user may be received. By way of example, in FIG. 3, a database query request for retrieval of activities (e.g. child records) of sharing entities (e.g. contacts, leads, opportunities, or any other custom entity) accessible by a user is received (300). In a preferred embodiment, the database query request is for a multi-tenant database.

Next, a determination is made as to whether the database query request has a filter for activities that may be handled by an index (302). If an index can efficiently handle the database request, then an index is used (304). For example, if the database query request is a request for all activities accessible to the user for the day, then an index may be used to retrieve all activities for the user for that day and ensure that only a fraction of disk reads occur to retrieve the data than would occur by querying against the Activity table. Alternatively, if an index can not efficiently handle the database request, then a determination is made as to whether the tenant uses a public sharing model (306). If the tenant uses a public sharing model (306), then the steps for an embodiment of query optimization for illustrated in FIG. 4 and described below can be used to optimize a query, according to one embodiment. If the tenant does use a private sharing model (308), then the steps for query optimization for the database query request in an embodiment may end. Alternatively, if the tenant uses a private sharing model (308), then statistics to determine a number of activities for a user may be generated and used to calculate a first cost for accessing or retrieving data (310).

Continuing with FIG. 3, statistics to determine a number of activities for a user may be generated by a query optimizer of a database and used to calculate a first cost (310). Statistics may be generated to determine the number of activities in the Activity table for a user. A sampling of activity data rows within the Activity table for the tenant may be used to create a statistic on the number of data rows for the user.

Statistics to determine a number of data rows of activities expected to be scanned for the user in accordance with ownership of related records, public related records, and access rights to shared records may be used to calculate a second cost (312). The data rows of activities that may be expected to be scanned are activities that are accessible to the user in response to a database query request. The number of child records (e.g. activities) related to shared records that are accessible to the user in accordance with access rights assigned to the shared records may be scanned for a user.

Next, a determination is made as to whether the first cost is preferable to the second cost (314). A cost benefit analysis may be performed to determine the best data path for determining accessibility rights for the user in response to a database query request. An index on the Activity table may be used for retrieval of the child records of shared records (e.g. activities) that are owned by the user and/or subordinates of the user. The data path approach for the first cost may be preferable for retrieval of child records of shared records if the user owns or has access to a large number of child records (e.g. Activity data rows). The data path approach for the second cost may be preferable if the user has access to a small number of child records. In alternative embodiments, other factors and metrics are used to determine cost.

If a first cost is preferable (314), then the Activity table is queried to retrieve a set of activities and filtered in accordance with filter conditions from the database query request (316). For example, if the database query indicates all accessible activities are desired for the user, then the activities may be filtered on the "tenant_id." In another example, the filter may be a range of dates in addition to the "tenant_id." Next, the set of retrieved queries is reduced to the set of accessible queries for the user (318).

An example for a data path approach for the database query when the first cost is preferred is, as follows:

Phase 1) In the first phase, the Activity table is scanned for activities that satisfy a filter. For example, pseudo code for a SQL query illustrates scanning the activities
"select activity_id, who_id, what_id from Activity a where tenant_id=9"

and the query may retrieve all activity_ids, who_ids, and what_ids for a tenant with a tenant_id 9.

Phase 2) Get all who_ids/what_ids (e.g. foreign keys to shared records) from Phase 1 and look up the foreign keys in the sharing entity sharing tables to reduce the set of who_ids/what_ids to an accessible set of who_ids/what_ids for the user. The who_id(s) may be placed in temporary table temp1 and the what_id(s) may be placed in temporary table temp2.

Phase 3) In phase 3, information desired out of the Activity table with the database query request may be retrieved (e.g. the Activity.name). An outer join may be performed with the two temporary tables from phase 2 and a temporary table for the user/group identification to ensure that only accessible activities are retrieved. The following is an example of pseudocode for a query to retrieve the accessible child records for a user/group:
select Activity.name from Activity a, temp1 twho, temp2 twhat, temp3 ug where a.tenant_id=9 and a.who_id=twho.column_value (+) and a.what_id=twhat.column_value(+) and a.owner=ug.column_value(+) and (twho.column_value is not null or twhat.column_value is not null or ug.column_value is not null) (where ug.userid may be the user ids for the user and/or user groups for the user).

If the first cost is not preferable (314), then the access rights for the user and subordinates for the user relevant sharing entities may be retrieved (320). The access rights for the relevant sharing entities may be the sharing entities indicated in the database query request. The sharing tables may be queried to retrieve who_ids and what_ids that are accessible to the user and subordinates of the user. The phase 1 and phase 2 of the approach above may be replaced by starting with retrieving accessible who_id(s) and what_id(s) from the sharing tables for each sharing entity.

Next, the accessible child records (e.g. activities) may be retrieved from the Activity table (322). An inline view query may be used retrieve the accessible child records for a data approach when the second cost is preferable to the first cost after the cost benefit analysis. For example, the inline sharing view query may perform:

a query to select activities visible by owner_id UNION
a query to select activities visible by who_id UNION
a query to select activities visible by what_id.

An example of pseudocode for the inline sharing view is, as follows:

select Activity.name from (select activity_id from temp twho, activity a1 where twho.column_value=a1.who_id and a1.tenant_id=9 union select activity_id from temp twhat, activity a1 where twhat.column_value=a1.who_id and a1.tenant_id=9 union select activity_id from temp ug, activity a1 where ug.column_value=a1.owner and a1.tenant_id=9) shr, Activity a where a.tenant_id=9 and a.activity_id=shr.activity_id In a preferred embodiment, the Activity table may have indexes on who_ids and what_ids, and row_ids may be selected from the Activity table for determining the sharing inline view. The sharing tables may be indexed based on the user. It may be desirable to retrieve the access rights for the user when the sharing tables are relatively thin and the retrieval may be perceived as inexpensive.

Figure 4:
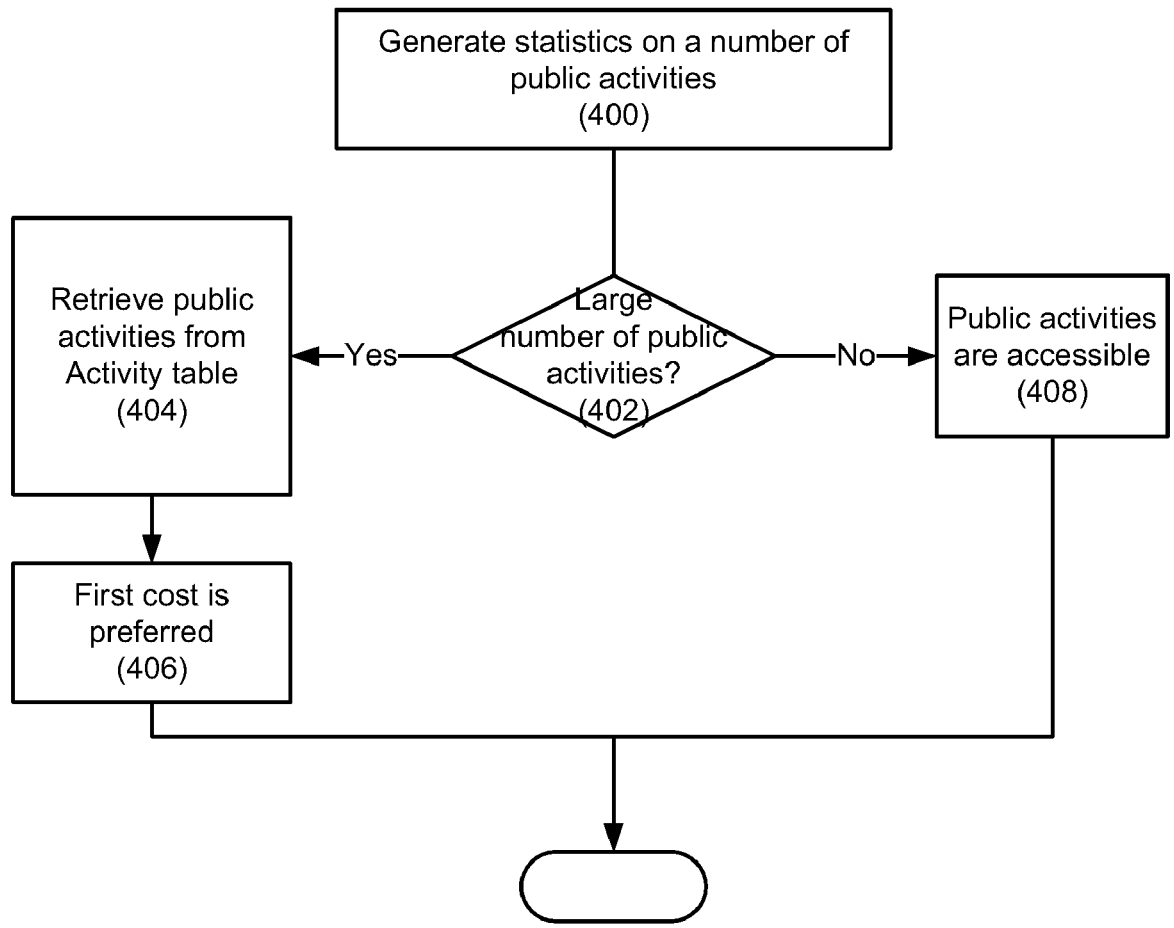
FIG. 4 illustrates an example of a flow diagram for an embodiment of optimizing queries in a multi-tenant database system environment.

FIG. 4 illustrates an example of a flow diagram for an embodiment of optimizing queries in a multi-tenant database system environment. Statistics may be generated on a number of public activities (400). Statistics may be kept on a number of public activities to determine if there are a large number of public activities accessible to the user. A determination is made as to whether there are a large number of public activities (402). In one or more embodiments, access rights for public related records (e.g. activities) may be performed to ensure that only public activities relevant to the user are retrieved. If there are a large number of public activities, then a large number of public activity rows may need to be scanned twice, once for a designation as a public record and a second time for their accessibility to the user. For example, the "account_id" for the shared records may be checked to determine if the user has access to the account for the activity prior to retrieving the public activity. If there are a large number of public activities accessible to the user (402), then the public activities are retrieved from the Activity table (404) and the first cost data path approach is preferred (406). Alternatively, if a determination is made that there are not a large number of public activities (402), then public activities are accessible to the user (408) and the data path approach when the second cost is preferable to the first cost may have the following inline query view:

a query to select activities visible by owner_id UNION
a query to select activities visible by who_id UNION
a query to select activities visible by what_id UNION
a query to select activities visible by public_id.

Sharing Checks

Sharing checks may be performed to determine shared records accessible to a user. In one or more embodiments, dynamic SQL queries may be optimized in a database system, and dynamic SQL queries may be viewed as running in three stages or phases. For example, when an activity query needs sharing checks, a query may be run in stage 3/phase 3 to determine the set of visible or accessible activities for a user from the activities retrieved with stage 1.

As used herein, the term activity query is to be construed broadly to cover any type of query and may refer to a query requested using an application programming interface (API), a SQL query, a SOQL query, a list view, and/or a report. Those skilled in the art will recognize that there are many types of queries that can be considered an activity query. As used herein, the term sharing checks is to be construed broadly to cover checking the scope of accessibility for one or more users. For example, sharing checks may be applied to determine scope of the accessibility of the user for shared records and/or records related to one or more shared records.

Stage 1-2

In an embodiment, a stage 1 query may run with the same filters as a stage 3 query, and the stage 1 query may select out the set of values for columns from any number of table(s) (e.g. who_id/what_id's from the Activity table for activity data rows) upon which we may need to check access in order to determine which activities are visible for sharing (e.g. who_id/what_id's). The filter used in stage 1 and stage 3 may be a filter entered by a user and/or an API in SOQL to the on-demand multi-tenant database. For example, the query may have a filter for a particular date range and/or a set of activities for a particular sharing entity.

In stage 2, an embodiment may run array access checks on column values (e.g. id's) returned by stage 1, and the visible values (e.g. id's) may be inserted into temporary tables. For example, array access checks may involve using an index only query to determine the visible who_id/what_id's for a user.

In one or more embodiments, for low visibility/accessibility users, sharing inline view queries are run, and the sets of all visible id's (e.g. who_id/what_id) may be inserted for each private sharing record directly into the temporary tables, bypassing stage 1 and stage 2 queries. This approach may be efficient for users, such as a lower level employee, who have access to a relatively small number of records in a big organization.

In another embodiment, an index-only stage 1 query may be run. A scan may be performed on an index for a query used to look up activity rows. For example, an index-only query may be run when there are no selective filters on a received query for the retrieval of activities for the user and/or when an inline sharing view query is not used.

Next, rows may be filtered out that are visible by ownership (e.g. with no checks for who_id/what_id's, with public who_id/what_id's, etc.) to get a set of relevant who/what id's to check access. In one or more embodiments, utilizing an index-only stage 1 query may result in dropping some of the unselective filters from the stage 1 query and could potentially result in a greater number of who/what id's to check access on than running a stage 1 query without an index only query. In other embodiments, the index scan may be faster than running a full activity stage 1 query because the table accesses may be avoided.

Stage 3

In an embodiment, a stage 3 query may entail performing an outer join to the temporary tables populated in stage 1-2 (e.g. an outer join applied to the twho and twhat of the temporary tables) and user role tables (e.g. user role blowout tables) to determine visibility of activities. For example, a low visibility user querying with no selective filters may result in scanning all activities in order to find a small number of visible rows.

In one or more embodiment, a stage 3 query may utilize knowledge of the number of rows in temporary tables, the number of rows visible to the user based on ownership, and the number of activity rows with who_id/what_id references to public entities. For example, if the sum of those counts for a number of rows in temporary tables, a number of rows visible to the user based on ownership and a number of activity rows for who/what references to public entities is small enough, then the query may utilize a peon view representing a union of:

activities visible based on ownership activities with a visible who (e.g. via the twho temporary table or a public entity)

activities with a visible what (e.g. via the twhat temporary table or a public entity)

activities owned by a calendar (e.g. for event API queries). Continuing with the example, the union may produce a set of activity row_ids which can be hash joined against row_ids from another indexed filter and/or joined to the activity table directly. A resulting set of activity rows may be considered a view and may be herein referred to throughout as a peon sharing view or inline sharing view. The peon sharing view may be considered by the query optimizer alongside any other potentially selective indexed filters, and the query optimizer may choose to use the peon sharing view.

In one or more embodiments, if a peon sharing view is used, then regular activity sharing joins may be used on top of this result from the view because a peon sharing view may return a superset of the true set of visible rows. For example, if an activity has a visible who and what that is not visible, then the activity would not be visible. In other embodiments, the view may be optimized to do the full activity sharing calculation and remove activities that have a visiblility for a sharing record with a who_id but do not have visibility to a sharing record based upon a what_id Reduce or Eliminate Activity Stage 1 Limits In one or more embodiments, query limits may be eliminated or reduced. The stage 1 query limits may be placed on activity queries to block inefficient queries. For example, if a stage 1 query returns too many results, then the query may be aborted and an "Operation Too Large" error may be returned to the user with a message recommending that they add more filters to their query. In some cases, the intent of limits may be to provide protection from running too many very expensive queries. A user may be dissatisfied when encountering these limits, and that the limits may not always be effective at protecting the system because a stage 1 query may scan a lot of rows (and hence be very expensive) without actually returning any data.

In some embodiments, the activity limits may be eliminated or reduced when a peon sharing view/plan is used for stage 1 because there may not be a stage 1 query run against the Activity table. In other embodiments, the stage 1 limit for queries may be eliminated, such as when a selective filter is used and/or with the peon sharing plan option. In another embodiment, row limits are eliminated from the stage 1 query. In a preferred embodiment, the limits for who_id(s)/what_id(s) returned was increased from 20,000 to 100,000 because the sharing plans limited a risk of low level users hitting the system with too many expensive queries.

System Overview

Figure 5:
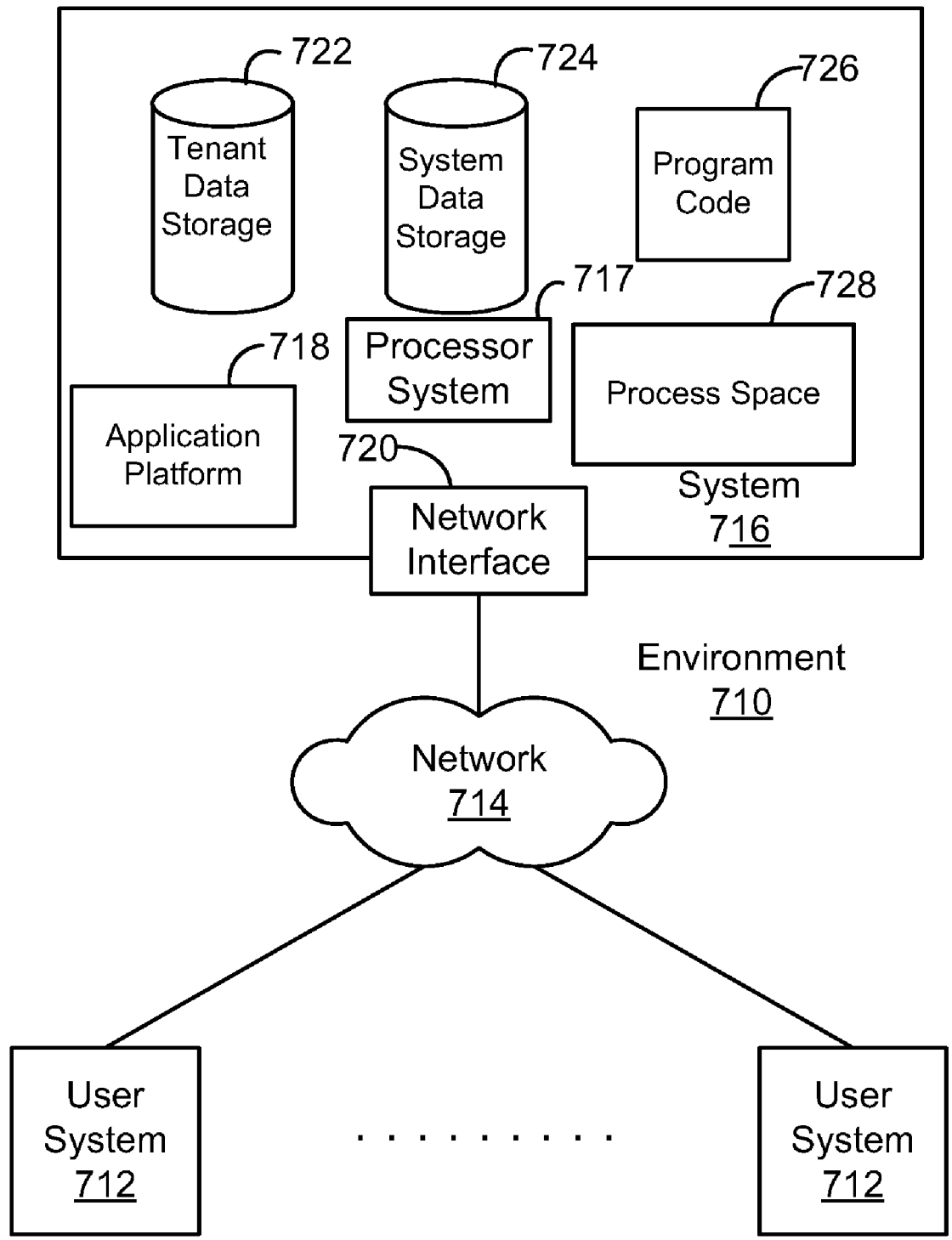
FIG. 5 illustrates a block diagram of an example of an environment wherein an on-demand database service might be used.

FIG. 5 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 5 (and in more detail in FIG. 6) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 5, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 5, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 5 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application (s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, Flex, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
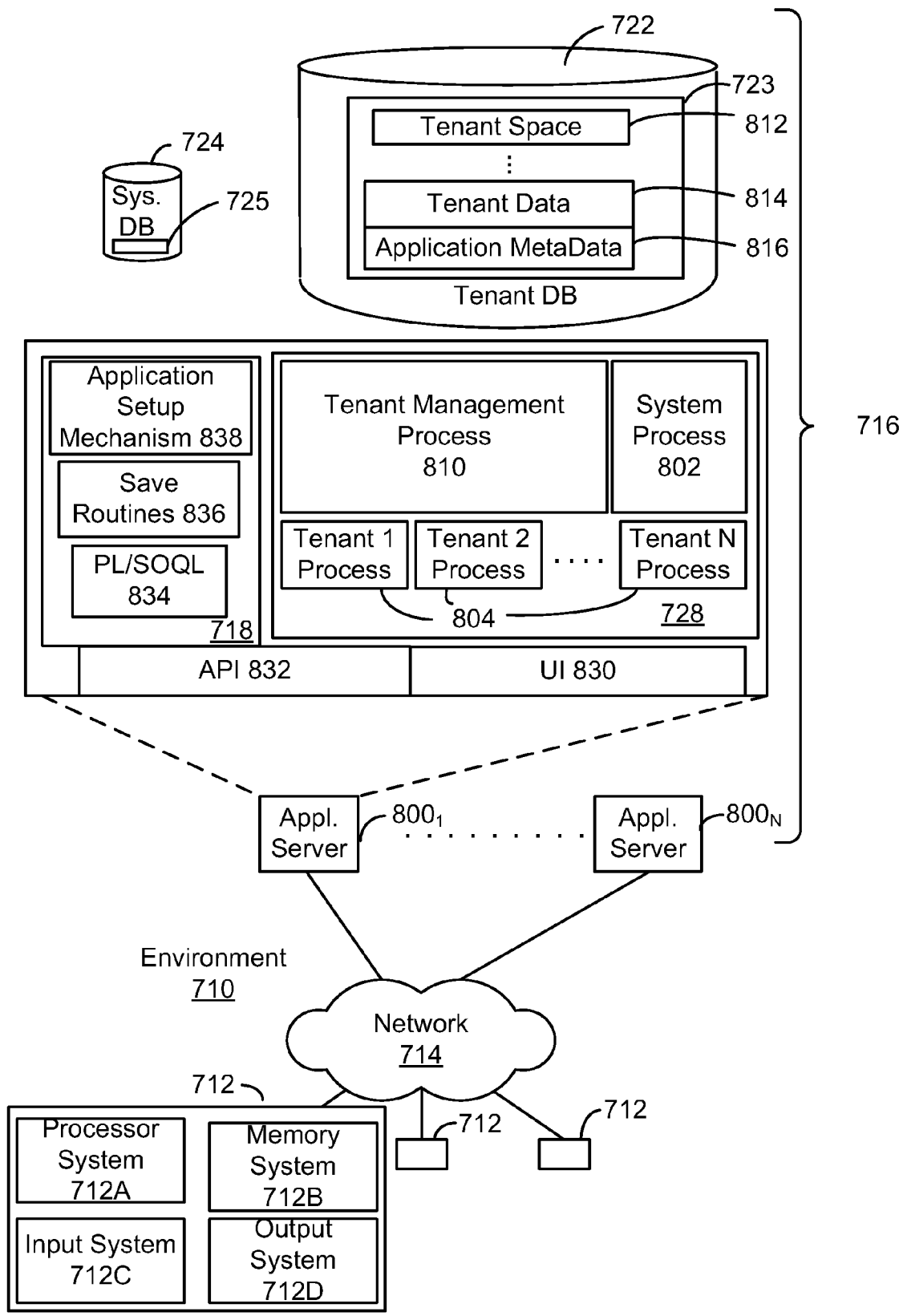
FIG. 6 illustrates a block diagram of an embodiment of elements of FIG. 6 and various possible interconnections between these elements.

FIG. 6 also illustrates environment 710. However, in FIG. 6 elements of system 716 and various interconnections in an embodiment are further illustrated. FIG. 6 shows that user system 712 may include processor system 712A, memory system 712B, input system 712C, and output system 712D. FIG. 6 shows network 714 and system 716. FIG. 6 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 8001-800N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 5. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 6, system 716 may include a network interface 720 (of FIG. 5) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 8001 might be coupled via the network 714 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for optimizing a query in a database system, the method comprising:
    generating a database statistic for a number of related records for one or more entities for at least one tenant, wherein a related record comprises a record with a relationship to a shared record in a database table for an entity from the one or more entities;
calculating a first cost for accessing the number of related records for at least one tenant;
calculating a second cost for accessing a number of related records accessible to a user;
performing a comparison of the first cost to the second cost to determine a data access path for retrieving accessible related records; and
determining the data access path for retrieving accessible related records based upon the comparison.

2. The method for optimizing a query in a database system of claim 1, the method further comprising:
retrieving a set of related records in accordance with a filter of a database query request; and
removing related records that are not accessible to the user from the set of related records.

3. The method for optimizing a query in a database system of claim 1, the method further comprising:
retrieving one or more access rights for the user for the one or more entities; and
retrieving accessible related records in accordance with the one or more access rights.

4. The method for optimizing a query in a database system of claim 1, wherein the shared record comprises a record with access rights for one or more users.

5. The method for optimizing a query in a database system of claim 1, wherein the related record is a child record of the shared record.

6. The method for optimizing a query in a database system of claim 1, the method further comprising:
generating a statistic for a number of public related records for the tenant;
determining whether a table for public related records is a relatively large size; and
determining the data access path for retrieving accessible related records when the table for public related records is a relatively large size, wherein the data access path for retrieving accessible related records comprises:
retrieving a set of related records in accordance with a filter of a database query request; and
removing related records that are not accessible to the user from the set of related records.

7. The method for optimizing a query in a database system of claim 1, the method further comprising:
executing a sharing inline view query, wherein the sharing inline view query determines accessibility of a user for one or more related records.

8. A computer-readable storage medium having one or more instructions thereon for optimizing a query in a database system, the instructions when executed by one or more processors causing the one or more processors to carry out:
generating a database statistic for a number of related records for one or more entities for at least one tenant, wherein a related record comprises a record with a relationship to a shared record in a database table for an entity from the one or more entities;
calculating a first cost for accessing the number of related records for at least one tenant;
calculating a second cost for accessing a number of related records accessible to a user;
performing a comparison of the first cost to the second cost to determine a data access path for retrieving accessible related records; and
determining the data access path for retrieving accessible related records based upon the comparison.

9. The computer-readable storage medium of claim 8, the instructions further comprising:
retrieving a set of related records in accordance with a filter of a database query request; and
removing related records that are not accessible to the user from the set of related records.

10. The computer-readable storage medium of claim 8, the instructions further comprising:
retrieving one or more access rights for the user for the one or more entities; and
retrieving accessible related records in accordance with the one or more access rights.

11. The computer-readable storage medium of claim 8, wherein the shared record comprises a record with access rights for one or more users.

12. The computer-readable storage medium of claim 8, wherein the related record is a child record of the shared record.

13. The computer-readable storage medium of claim 8, the instructions further comprising:
generating a statistic for a number of public related records for the tenant;
determining whether a table for public related records is a relatively large size; and
determining the data access path for retrieving accessible related records when the table for public related records is a relatively large size, wherein the data access path for retrieving accessible related records comprises:
retrieving a set of related records in accordance with a filter of a database query request; and
removing related records that are not accessible to the user from the set of related records.

14. A system for optimizing a query in a database system, the system comprising:
a processor; and
one or more stored sequences of instructions which, when executed by the processor, cause the processor to carry out:
generating a database statistic for a number of related records for one or more entities for at least one tenant, wherein a related record comprises a record with a relationship to a shared record in a database table for an entity from the one or more entities;
calculating a first cost for accessing the number of related records for at least one tenant;
calculating a second cost for accessing a number of related records accessible to a user;
performing a comparison of the first cost to the second cost to determine a data access path for retrieving accessible related records; and
determining the data access path for retrieving accessible related records based upon the comparison.

15. The system for optimizing a query in a database system of claim 14, wherein the one or more stored sequences of instructions which, when executed by the processor, cause the processor to further carry out:
retrieving a set of related records in accordance with a filter of a database query request; and
removing related records that are not accessible to the user from the set of related records.

16. The system for optimizing a query in a database system of claim 14, wherein the one or more stored sequences of instructions which, when executed by the processor, cause the processor to further carry out:
retrieving one or more access rights for the user for the one or more entities; and retrieving accessible related records in accordance with the one or more access rights.

17. The system for optimizing a query in a database system of claim 14, wherein the shared record comprises a record with access rights for one or more users.

18. The system for optimizing a query in a database system of claim 14, wherein the related record is a child record of the shared record.

19. The system for optimizing a query in a database system of claim 14, wherein the one or more stored sequences of instructions which, when executed by the processor, cause the processor to further carry out:

generating a statistic for a number of public related records for the tenant;

determining whether a table for public related records is a relatively large size; and determining the data access path for retrieving accessible related records when the table for public related records is a relatively large size, wherein the data access path for retrieving accessible related records comprises:

retrieving a set of related records in accordance with a filter of a database query request; and removing related records that are not accessible to the user from the set of related records.

20. The system for optimizing a query in a database system of claim 14, wherein the one or more stored sequences of instructions which, when executed by the processor, cause the processor to further carry out:

executing a sharing inline view query, wherein the sharing inline view query determines accessibility of a user for one or more related records.

* * * * *